3,504,280
   DUAL FREQUENCY ADMITTANCE GAUGE HAV-
      ING IMPROVED FREQUENCY RESPONSE UNRE-
      LATED TO FEEDBACK RESPONSE TIME
Robert V. Byrd, Columbus, Ohio, assignor to Industrial
   Nucleonics Corporation, a corporation of Ohio
         Filed Apr. 29, 1968, Ser. No. 725,029
         Int. Cl. G01n 27/22, 27/26; G01r 17/06
U.S. Cl. 324—61                                  13 Claims

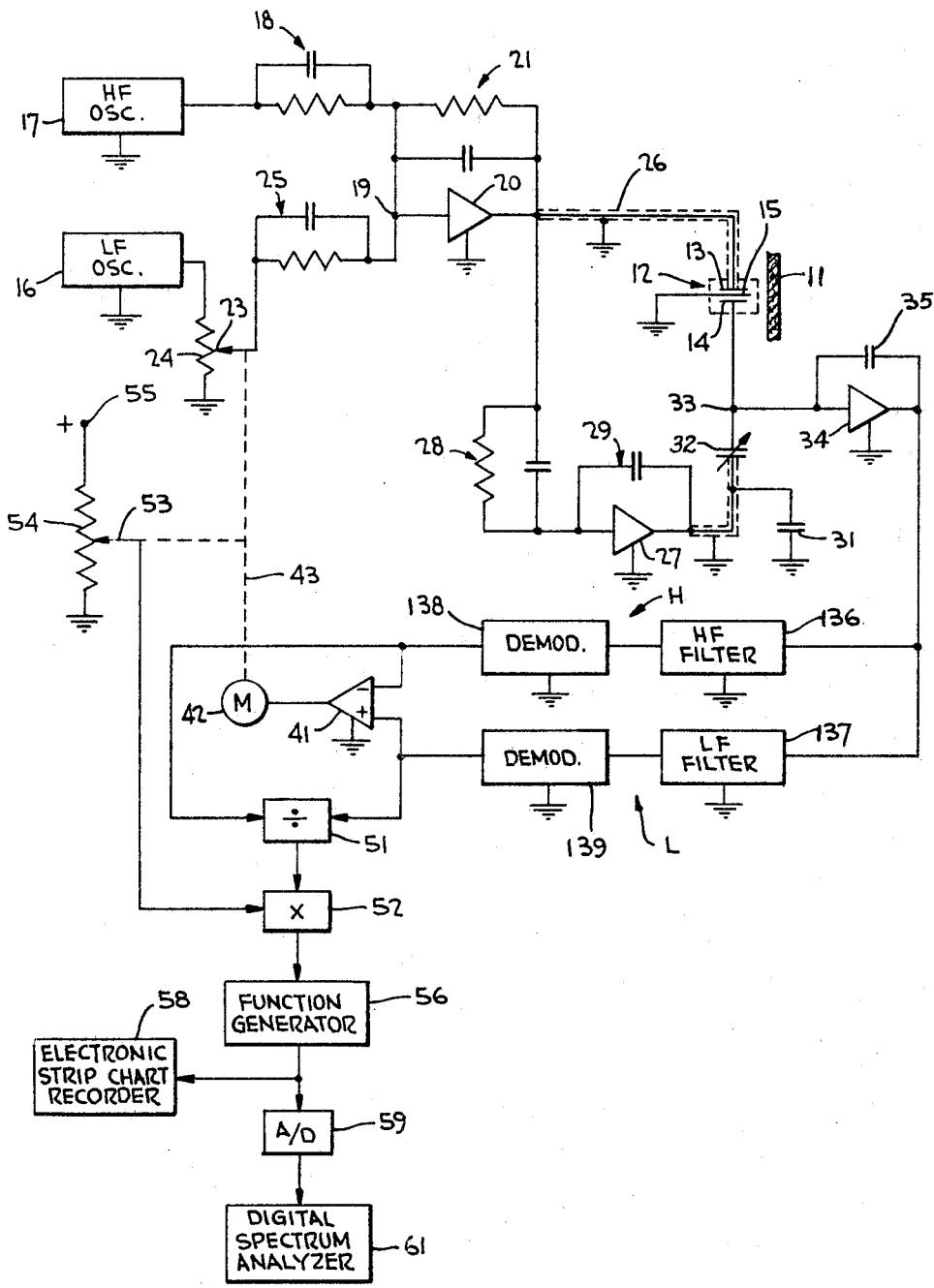

ABSTRACT OF THE DISCLOSURE

A capacitance moisture measuring gauge is responsive to sources of high and low frequency oscillations. The responses of the gauge to the high and low frequency sources are detected; the voltage of one of the sources is adjusted so that the high and low frequency gauge responses are equalized by an electromechanical servomechanism. The electromechanism servomechanism output is combined with indications of the gauge high and low frequency responses to eliminate the lag inherent in the servomechanism and enable high frequency parameters sensed by the gauge to be ascertained with a spectrum analyzer.

---

The present invention relates generally to dual frequency gauges for measuring material admittance properties and, more particularly, to a dual frequency admittance gauge including means for combining the gauge output responses at both of said frequencies with an indication of the response of a controller for amplitudes of the gauge outputs.

In United States Patent No. 3,241,062, issued to Baird, on Mar. 15, 1966, there is disclosed a gauge for measuring the admittance properties of a material with a capacitance probe driven by sources of relatively high and low frequency. Indications of the probe output response to the high and low frequencies are detected and compared to derive the desired admittance properties. Because the material generally has a tendency to attenuate current at the high frequency more than at the low frequency, problems of high frequency signal detection may be prevalent. According to the apparatus of the Baird patent, the high and low frequency probe output responses are substantially equalized by adjusting the relative amplitudes of the high and low frequency sources applied to the probe. The relative amplitudes of the high and low frequency sources are controlled by an electromechanical servomechanism responsive to an error signal indicative of the difference between the probe high and low frequency output responses. In other prior art systems relying upon principles similar to the Baird disclosures, detection of both the high and low frequencies is facilitated with an A.G.C. amplifier that effectively replaces the servomechanism or is responsive to the probe output signal.

While the prior art systems function admirably to provide indications of the material properties, the speed of response thereof is limited; in the system disclosed by Baird the response speed is limited by the electromechanical servomechanism and in the A.G.C. systems, by the response of a low pass filter having a long time constant. Thereby, high frequency admittance variations of the material being monitored may not be accurately reflected in the indications derived by the prior art gauge.

Because of the relative complexity of the prior art gauge, the response speed thereof is not related in a simple manner to the frequency variations of the admittance in the material being monitored; nor can the system speed of response be defined in terms of a relatively simple time constant. Thereby, it is relatively difficult, if not impossible, to define a time constant in order to convey the true nature of the prior art gauge frequency response and a conventional filter can not be designed to equalize the different frequencies in the detected signal.

The response times of the prior art servomechanism and A.G.C. controllers are functions of variations of the material being measured. Since the property variations of the material being measured are subject to unpredictable variations, within limits, no relatively simple time constant can be defined and no shaping networks may be properly utilized to increase the high frequency response and indications of the moisture properties. In particular, the gauge disclosed by the Baird patent includes a feedback drive mechanism wherein the servomechanism output shaft is driven at a relatively constant velocity whenever an error signal in excess of a few micrcovolts is derived. The servo shaft velocity is such that a full-scale response requires on the order of four seconds, i.e., four seconds are required to change the amplitude of one of the sources from a maximum to a minimum voltage, dictated by the properties of the material being measured. It is thus appreciated that the gauge response depends upon the admittance values detected and, therefore, cannot be predicted.

In accordance with the present invention, the high frequency admittance properties of a material being measured with a system including an electromechanical or A.G.C. feedback controller are derived precisely by dividing the high frequency probe response by the low frequency response. In a system of the type disclosed by Baird the resulting quotient is combined with an indication of the servo mechanism position. These variables are combined in accordance with:

$$\alpha \times \left(\frac{S_H}{\alpha S_L}\right)$$

where:

$\alpha$ = the attenuation factor introduced by the servomechanism on the low frequency source driving the probe;
$S_H$ = the high frequency output response of the probe;
$\alpha S_L$ = the low frequency output response of the probe.

The low frequency output response of the probe, $\alpha S_L$, is always proportional to the attenutation factor $\alpha$ and is equal exactly to the attenuation factor, $\alpha$, multiplied by the low frequency admittance properties of the material, $S_L$. By combining the gauge high and low frequency output responses with an indication of the servomechanism position in accordance with the expression given supra, a ratio completely independent of the servo speed of response and amplitude, $\alpha$, is provided. Thereby, the ratio provides a complete indication of the material properties for all frequencies detected by the probe.

If the gauge is utilized for measuring material moisture content, the ratio is a function of only moisture in the material and is independent of the material mass. To derive indications of moisture from the ratio, the ratio signal is fed to a nonlinear function generator. The function generator output is coupled to a spectrum analyzer, thereby to provide a complete frequency versus amplitude analysis of the moisture properties of the material analyzed.

It is, accordingly, an object of the present invention to provide a new and improved dual frequency system for measuring material admittance properties with a capacitance probe in combination with a feedback controller for adjusting the amplitude of at least one of the frequencies detected by the probe, wherein a signal is derived which is an accurate replica of the material variations over a wide frequency spectrum.

Another object of the invention is to provide a system for deriving spectral information regarding admittance variations of a material, wherein certain of the measuring system factors tending to degrade the spectral analysis are eliminated.

A further object of the invention is to provide a new and improved dual frequency moisture measuring gauge wherein the speed of response of a servomechanism or A.G.C. network controlling the amplitude of at least one of the frequencies has virtually no effect on the moisture indication.

An additional object of the invention is to provide a new and improved dual frequency moisture measuring gauge wherein characteristics, such as response speed, linearity errors and positional errors, of an electromechanical servomechanism controlling the amplitude of at least one of the frequencies have virtually no effect on the moisture indication.

The above and still further objects, features and advantages of the present invention will become apparent upon consideration of the following detailed description of one specific embodiment thereof, especially when taken in conjunction with the accompanying drawing, wherein:

The single figure of the drawing is a circuit diagram of one embodiment of the invention.

Reference is now made to the drawing wherein there is illustrated a system for determining the moisture properties of sheet 11, which may be a relatively dry sheeet emerging from a dryer section of a paper manufacturing plant. The moisture characteristics of sheet 11 are determined with capacitor probe 12, having a transmitting electrode 13, a receiving electrode 14 and a grounded shield plate 15 interposed between electrodes 13 and 14. Sheet 11 passes in a fringing field between electrodes 13 and 14 and modifies the current passing between the electrodes in accordance with the sheet real and reactive admittance properties.

Transmitting electrode 13 of probe 12 is excited with a pair of sinusoidal currents of relatively low and high frequencies as derived from oscillators 16 and 17, respectively. The high frequency oscillations, generally on the order of 100 kHz. to 500 kHz., derived from source 17 are coupled through impedance network 18 to input terminal 19 of summing operational amplifier 20 that includes stabilizing feedback network 21. The low frequency oscillations, having a frequency on the order of 1 kHz. to 5 kHz., derived from source 16 are coupled to input terminal 19 via tap 23 of potentiometer 24 and impedance network 25. The combined high and low frequency signals at the output of amplifier 20 are applied via shielded cable 25 to transmitting electrode 13 of probe 12.

Paper sheet 11 in the fringing field of probe 12 functions as a variable admittance or attenuator to the low and high frequency electric fields supplied thereto by transmitting electrode 13. The admittance range of sheet 11 to the low frequency oscillations is considerably greater than the admittance range of the sheet to the high frequency oscillations. The amplitude range of the low frequency signal is so large that conventional detectors cannot generally provide an accurate indication of the sheet admittance properties.

To enable the high and low frequency currents picked up by receiving electrode 14 to be detected in the most facile manner, the low and high frequency components should have approximately the same ratio of highest to lowest values. To this end, the amplitude of the low frequency source is adjusted to be greater than the amplitude of the voltage derived by the high frequency source and the output of the low frequency source 16 is variably attenuated by means of slider 23 of potentiometer 24. As is seen infra, the voltage at slider 23 is adjusted so that the high and low frequency components picked up by receiving electrode 14 are of approximately equal amplitude regardless of the admittance properties of sheet 11.

To provide a zero output voltage at receiving electrode 14 for both the high and low frequencies under a standardized condition of only air in the fringing field of probe 12, the probe is connected in a bridge-like circuit. The bridge-like circuit, in addition to the arm containing probe 12, comprises a second arm including unity gain inverting amplifier 27. The input of amplifier 27 is connected via impedance network 28 to the output terminal of amplifier 20. To establish the gain of amplifier circuit 27 at −1, stabilizing feedback network 29 is provided. The output terminal of amplifier 27 is coupled to ground through fixed capacitor 31 and to receiving electrode 14 via variable capacitor 32. The value of capacitor 32 is adjusted so that the voltage at terminal 33, common to receiving electrode 14 and one electrode of capacitor 32, is zero for both the low and high frequencies of sources 16 and 17 in response to only air being in the fringing field of probe 12 between electrodes 13 and 14.

In use, the admittance properties of sheet 11 vary the high and low frequency currents in the electric field between electrodes 13 and 14. In response to the admittance variations of sheet 11, the high and low frequency oscillations at terminal 33 are varied in amplitude. The amplitudes of the high and low frequency components at terminal 33 are detected as D.C. output voltages with a pair of parallel processing channels H and L.

Channels H and L are driven by the output voltage of amplifier 34, having an input terminal responsive to the high and low frequency components at terminal 33 and including feedback capacitor 35 for gain stabilization. Channel H includes filter 36 having a relatively high Q to prevent any signals in the output spectrum of amplifier 36, except the frequency of source 17, from being derived at its output. Similarly, filter 37 is of relatively high Q to prevent the derivation of any significant output component thereby, except at the frequency of source 16. The output voltages of filters 136 and 137 are respectively coupled to amplitude demodulators 138 and 139, which generate positive D.C. voltages respectively commensurate with $S_H$ and $\alpha S_L$, where: $S_H$ is proportional to the admittance of sheet 11 to the frequency of source 17; $S_L$ is proportional to the admittance of sheet 11 to the frequency of source 16; and $\alpha$ equals the attenuation factor introduced by slider 23 on the output voltage of oscillator 16.

The output voltages of demodulators 138 and 139 are respectively applied as the positive and negative input voltages to D.C. differential amplifier 41. The difference output voltage of amplifier 41 drives D.C. motor 42, having output shaft 43 that drives slider 23. Motor 42 responds to the difference output voltage of amplifier 41 until the two inputs of the amplifier are equal, i.e., $S_H - \alpha S_L = 0$ and $\alpha$ equals $S_H/S_L$. The rotation of shaft 43, $\alpha$, is a nonlinear function of the moisture of sheet 11 independently of the mass or density of the sheet, as described fully in the previously mentioned Baird patent.

By adjusting the voltage at potentiometer slider 23 with motor shaft 43 in the manner indicated, the ratio of the maximum to minimum voltages of the high and low frequencies at terminal 33 are maintained approximately equal, regardless of the relatively high and low frequency admittances of sheet 11. Thereby, demodulator 139 can be of a relatively conventional type and presents no special design considerations.

All of the apparatus described to the present is disclosed by the previously mentioned Baird patent. One problem with the prior art gauge resides in the inherent, substantial time lag of the servoloop necessary to adjust the position of slider 23. Hence, if it is desired, for example, to provide a frequency analysis of the moisture content of sheet 11, no meaningful data can be derived by utilizing the prior art system described to the present.

It is, therefore, a primary object of the invention to provide a system for enabling the high frequency components of moisture in sheet 11 to be obtained and calculated. To this end, the D.C. output signals of demodulators 138 and 139 and the position of shaft 43 are combined in accordance with:

$$(\alpha)\frac{S_H}{(\alpha S_L)}$$

As indicated supra, the terms ($\alpha$) and ($\alpha S_L$) are respectively indicative of the position of shaft 43 and the output voltage of demodulator 139. The values of $\alpha$ in the above expression are always identical regardless of the time lag of the servomechanism driving shaft 43. Thereby, while there may be a lag in maintaining the high and low frequency components at terminal 33 identical, there is no lag in the ratio $S_H/S_L$. The ratio $S_H/S_L$ is therefore indicative solely of the admittance properties of sheet 11 to the low and high frequencies of sources 16 and 17, and includes all of the high frequency components that can be detected with demodulators 138 and 139. Since the time constants of demodulators 138 and 139 have periods much less than the periods of any moisture variations in sheet 11, the ratio $S_H/S_L$ is a faithful indication of virtually all frequency components of the sheet moisture.

One embodiment for synthesizing the above expression comprises D.C., analog divider 51 having numerator and denominator input terinals respectively responsive to the D.C. output voltages of demodulators 138 and 139. The D.C. output voltage of divider 51, varying in amplitude in accordance with $S_H/\alpha S_L$, is multiplied with a D.C. signal directly proportional to the rotation angle, $\alpha$, of shaft 43, in D.C. analog multiplying network 52. The input voltage to multiplier 52, indicative of the angle $\alpha$, is derived from slider 53 of potentiometer 54, excited with a D.C. voltage at terminal 55; slider 53 is driven directly from shaft 43.

Multiplier 52 derives a D.C. output voltage proportional in amplitude to the ratio $S_H/S_L$. The ratio $S_H/S_L$ is nonlinearly related to moisture content of sheet 11 in a well known manner, whereby large values of the ratio are commensurate with low moisture content, while small values of the ratio indicate relatively large moisture content. To enable a voltage to be derived that is directly proportional to the moisture content of sheet 11, the ratio output of multiplier 52 is applied to function generator 56, which may be of any well known type, such as a plurality of shunt biased diodes. Function generator 56 is designed to derive a D.C. output voltage directly proportional to the moisture content of sheet 11, as determined by the ratio $S_H/S_L$. The D.C. voltage of function generator 56 is applied to an indicator including strip chart recorder 58, which is preferably of the electronic type to provide accurate indications of the high and low frequency moisture content of sheet 11. Recorder 58 thereby provides a permanent record of the moisture content of sheet 11, including the high frequency components thereof.

To provide a spectral analysis of the amplitude of the different frequency components in sheet 11, the output of function generator 56 is applied to a spectrum analyzer 58. Preferably, spectrum analyzer 58 is of the digital type and includes analog-to-digital converter 59 and digital spectrum analyzer 61, which is preferably of the type disclosed in the copending application of David A. Spitz, Ser. No. 665,135, filed Sept. 1, 1967, and commonly assigned with the present invention.

The functions performed by divider 51, multiplier 52 and function generator 56 can be replaced with a digital computer including analog-to-digital converters responsive to the voltages derived from demodulators 138 and 139 and slider 53. A digital computer, however, requires a separate analog-to-digital converter for each of the three inputs thereof; in addition, the amount of storage required to synthesize the moisture versus ratio function would be so large that the memory capacity of many presently available computers would be exhausted. Hence, the analog computer approach specifically described in connection with the figure is the more feasible approach to combining the signals indicative of $S_H$, ($\alpha S_L$) and ($\alpha$).

While there has been described and illustrated one specific embodiment of the invention, it will be clear that variations in the details of the embodiment specifically illustrated and described may be made without departing from the true spirit and scope of the invention. For example, the electromechanical servomechanism comprising potentiometer 24, slider 23 and motor 42 can be replaced with an A.G.C. amplifier feeding impedance network 25 with a low frequency signal from source 16. Such an amplifier would include a gain control terminal responsive to the output terminal of amplifier 41. The problem anent poor response time is extant with an A.G.C. system because such a circuit includes a long time constant low pass filter in the amplifier gain control network. The filter output voltage would be fed to the input terminal of multiplier 52.

Another possible modification involves feeding constant amplitude sources to probe 12 and connecting an A.G.C. amplifier to the probe output terminal 33. The A.G.C. amplifier gain would be controlled in reponse to a comparison of the output of demodulator 39 with a reference voltage, as taught in United States Patent 3,255,411, to Norwich. To eliminate the effect of the poor response time of the A.G.C. amplifier, the output of the high frequency detector would be divided by the output of the low frequency detector.

I claim:

1. A system for deriving high frequency admittance properties of a material comprising a capacitance probe for sensing said properties, a source of first and second frequencies exciting said probe, detector means responsive to said probe for deriving first and second signals respectively indicative of the probe response to said first and second frequencies, feedback means having a response time greater than the period of variations of the admittance properties combining said first and second signals for controlling the relative amplitudes of the first and second frequencies exciting said gauge, and means responsive to said first and second signals and to said feedback means for further combining said first and second signals with an indication of control by said feedback means for deriving an indication of the properties that is unrelated to the response time of the feedback means.

2. The system of claim 1 wherein said indication deriving means includes means for deriving an output signal indicative of ($\alpha$)($S_1/\alpha S_2$), where: $\alpha$=the feedback means control; and $S_1$ and ($\alpha S_2$) are respectively the amplitudes of the probe output at said first and second frequencies.

3. The system of claim 2 further including nonlinear function generating means responsive to said output signal for deriving an indication of the moisture properties of said material.

4. The system of claim 3 further including a spectrum analyzer responsive to the moisture indication derived by said function generating means.

5. The system of claim 2 wherein said feedback means includes an electromechanical servomechanism and the control by the feedback means is the servomechanism position.

6. In a system for measuring admittance properties of a material with a capacitance proble driven by a plurality of different frequencies wherein approximately a constant amplitude relationship of the probe output response at the different frequencies is maintained with feedback means controlling the relative amplitudes of the frequencies applied to the probe, the improvement comprising means for combining signals indicative of the amplitudes of the probe output at the different frequencies with a signal indicative of the response of the feedback means to derive an indication of the properties that is unrelated to the response time of the feedback means.

7. A system for deriving an indication of a material property comprising a low frequency source, a high frequency source, a capacitance probe responsive to said sources for applying said high and low frequencies to the material and deriving an output signal indicative of the admittance properties of the material at said frequencies, means responsive to said output signal for deriving first and second responses respectively indicative of the material admittance properties at said low and high frequencies, first means combining said responses for deriving an error signal, a servomotor responsive to said error signal for adjusting the relative amplitudes of the currents applied to said probe at said frequencies, and second means responsive to said first and second signals and to said feedback means for combining said first and second signals with an indication of control by said feedback means for deriving an indication of the property that is unrelated to the response time of the feedback 8. The system of claim 7 wherein said second combining means includes means for deriving an output signal indicative of $(\alpha)(S_1/\alpha S_2)$, where: $\alpha$=the servomotor position; and $S_1$ and $(\alpha S_2)$ are respectively the amplitudes of the probe output at said first and second frequencies.

9. The system of claim 8 further including nonlinear function generating means responsive to said output signal for deriving an indication of the moisture properties of said material.

10. The system of claim 8 further including a spectrum analyzer, and means for coupling said output signal to said spectrum analyzer.

11. A system for deriving high frequency admittance properties of a material comprising a capacitance probe for sensing said properties, a source of first and second frequencies exciting said probe, detector means responsive to said probe for deriving first and second signals respectively indicative of the probe response to said first and second frequencies, feedback means having a response time greater than the period of variations of the admittance properties responsive to at least one of said signals for controlling the amplitude of at least one of the frequencies fed to said detector means, and circuit means for dividing the first signal by the second signal to derive an indication of admittance properties that is unrelated to the response time of the feedback means.

12. The system of claim 11 wherein said feedback means includes means for varying the amplitude of both frequencies derived from the probe in a like manner in response to the amplitude of the probe output at only one of said frequencies.

13. A system for deriving high frequency admittance properties of a material comprising a capacitance probe for sensing said properties, a source of first and second frequencies exciting said probe, detector means responsive to said probe for deriving first and second signals respectively indicative of the probe response to said first and second frequencies, feedback means having a response time greater than the period of variations of the admittance properties combining said first and second signals for controlling the relative amplitudes of the first and second signals derived from said detector means, and means responsive to said first and second signals and to said feedback means for further combining said first and second signals with an indication of control by said feedback means for deriving an indication of the properties that is unrelated to the response time of the feedback means.

References Cited

UNITED STATES PATENTS

| 3,241,062 | 3/1966 | Baird | 324—61 |
| 3,323,045 | 5/1967 | Baird | 324—61 |
| 3,323,047 | 5/1967 | Martin et al. | 324—61 |

EDWARD E. KUBASIEWICZ, Primary Examiner

J. M. HANLEY, Assistant Examiner

UNITED STATES PATENT OFFICE
CERTIFICATE OF CORRECTION

Patent No. 3,504,280  Dated March 31, 1970

Inventor(s) Robert V. Byrd

It is certified that error appears in the above-identified patent and that said Letters Patent are hereby corrected as shown below:

Claim 6, column 6, line 63, change "proble" to ---probe---.

Claim 7, column 7, line 16, after "feedback" insert ---means.---.

Signed and sealed this 1st day of May 1973.

(SEAL)
Attest:

EDWARD M. FLETCHER, JR.        ROBERT GOTTSCHALK
Attesting Officer              Commissioner of Patents